(12) United States Patent
Kitashou

(10) Patent No.: US 8,606,039 B2
(45) Date of Patent: Dec. 10, 2013

(54) INFORMATION PROCESSING APPARATUS, CONTROL METHOD FOR THE SAME, AND COMPUTER PROGRAM

(75) Inventor: Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 822 days.

(21) Appl. No.: 12/565,193

(22) Filed: Sep. 23, 2009

(65) Prior Publication Data

US 2010/0086233 A1 Apr. 8, 2010

(30) Foreign Application Priority Data

Oct. 6, 2008 (JP) ................................. 2008-259996

(51) Int. Cl.
*G06K 9/36* (2006.01)
(52) U.S. Cl.
USPC ............ 382/276; 345/545; 348/264; 380/47; 382/112

(58) Field of Classification Search
None
See application file for complete search history.

(56) References Cited

U.S. PATENT DOCUMENTS

| 5,625,703 A * | 4/1997 | Okuda et al. ................. 382/112 |
| 6,614,442 B1 * | 9/2003 | Ouyang et al. ............... 345/545 |
| 2004/0139441 A1 | 7/2004 | Kaburaki et al. | |
| 2007/0052840 A1 * | 3/2007 | Okuno .......................... 348/364 |
| 2008/0118060 A1 * | 5/2008 | Kim et al. ...................... 380/47 |

FOREIGN PATENT DOCUMENTS

| JP | 2002-328883 | 11/2002 |
| JP | 2004-220093 | 8/2004 |

* cited by examiner

*Primary Examiner* — Tsung-Yin Tsai
(74) *Attorney, Agent, or Firm* — Cowan, Liebowitz & Latman, P.C.

(57) ABSTRACT

An information processing apparatus comprises: a division unit dividing input data; a processing unit performing predetermined processing for the divided data; a generation unit generating intermediate data by referencing the processed divided data, and combining the intermediate data; a temporary storage unit storing the processed divided data; and a detection unit selecting a group of divided data that includes the processed divided data, and determining whether or not all processed divided data in the selected group is stored, is provided. As a result of the determination, if it is determined that all the processed divided data is stored, the generation unit generates intermediate data and then deletes all the processed divided data in the selected group, and if it is determined that a part of the processed divided data is not stored, the processing unit preferentially generates the part of the processed divided data.

9 Claims, 7 Drawing Sheets

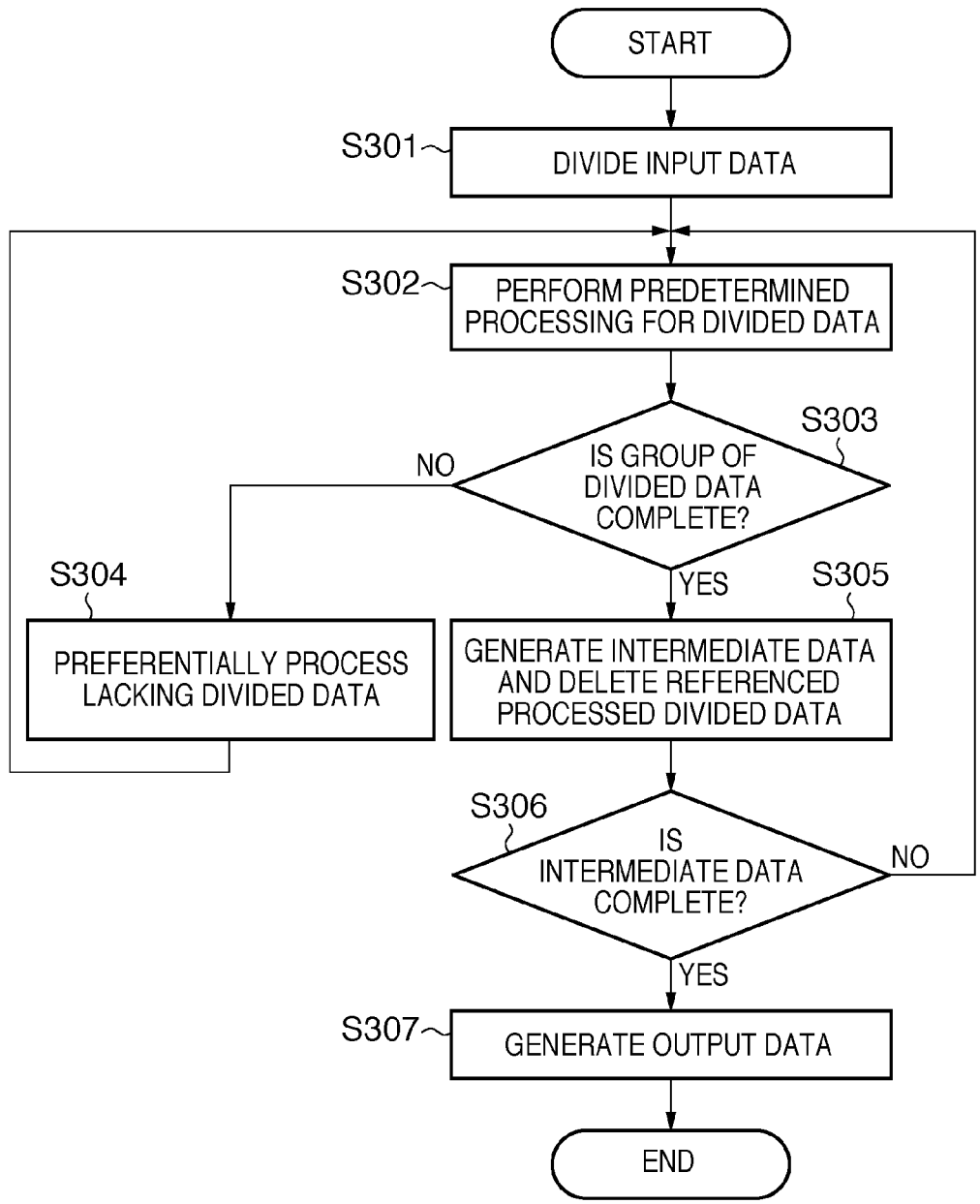

INFORMATION PROCESSING APPARATUS, CONTROL METHOD FOR THE SAME, AND COMPUTER PROGRAM

BACKGROUND OF THE INVENTION

1. Field of the Invention

The present invention relates to an information processing apparatus, a control method for the same, and a computer program.

2. Description of the Related Art

In recent years, information processing apparatuses that process images or video have had a large size of data to be processed, and the amount of data handled in the information processing apparatuses has been increasing. This has caused increases in the processing time and the circuit size in the information processing apparatuses.

As such, attempts are made to solve the above problems by parallel processing. For example, a technique is known in which data to be processed is divided, parameters necessary for each kind of processing are added, and each piece of the data is processed as an independently processable processing unit based on the parameters (for example, see Japanese Patent Laid-Open No. 2002-328883).

An information processing apparatus according to this technique has a first processing block and a second processing block connected with each other via a data communication path. The first processing block generates a packet having a data portion that includes image data divided into rectangles and a header portion that includes processing parameters. The first processing block outputs subpackets created by further dividing the packet to the second processing block. The second processing block has a plurality of subblocks each performing different image processing, and executes the received subpackets in the subblocks. Thus, dividing image data of a large size into packets allows parallel processing and therefore a reduction in the processing time. However, if data needed for processing is present across a plurality of packets, it is necessary to temporarily store all the packets required for the processing. This poses a problem of an increase in the size of a packet storage unit.

In image processing in which a plurality of execution results are integrated and output at the last stage of parallel processing, a buffer is generally used to perform queuing. One technique used for this purpose is to have a storage area and a task starting unit, where the storage area holds execution results of processing at preceding stages, and the task starting unit starts processing at a next stage upon recognizing that complete data is present in the storage area (for example, see Japanese Patent Laid-Open No. 2004-220093). An apparatus according to this technique includes a task starting unit that determines whether or not each of a plurality of tasks can be started, an execution task determination unit that determines a task to be started based on the determination result of the task starting unit, and a processor core that executes the task determined by the execution task determination unit. The task starting unit has a plurality of FIFO storage units connected thereto, and determines whether or not a FIFO storage unit holds data to be input to a task and whether or not a free space is present in another FIFO storage unit in which a task execution result is to be stored. Based on the result of this determination, the execution task determination unit determines a task to be started. Thus, a task to be executed can be started depending on the data storage state of the FIFO storage units. Therefore, a plurality of tasks can be processed without overhead of scheduling by an operating system for the period from when it is ready to start the tasks to when the tasks are started. However, even in this method, if data needed for the processing spans a plurality of pieces of data, data received until the complete necessary data becomes available has to be held. This poses a problem of an increase in the size of a data storage unit.

As described above, in a parallel information processing apparatus in which processing data is divided and processed, if a data processing unit performs processing by referencing a plurality of pieces of data, the data processing unit cannot start the processing until all the reference data becomes available. Therefore, the data processing unit has to wait for all the necessary reference data to become available while holding all data received until all the necessary reference data becomes available. The timing at which all the necessary data becomes available widely varies with factors such as the timing of issuing the data, the degree of congestion in a communication path, the difference of the processing time in each data processing unit, and the like. This poses a problem of an increase in the size of a storage unit that should be included in the processing apparatus.

Such a problem can arise in image processing that involves composition from a plurality of images, for example. In the composition processing, the processing cannot be started until the same portions of a plurality of pieces of image data for composition become available. Therefore, it is necessary to have a buffer of a size capable of holding all image data received until the image data of the same portions become available. Besides the composition processing, a similar problem also arises in progressive conversion (IP conversion) in which temporally different frames of the same video are referenced to perform processing.

SUMMARY OF THE INVENTION

In an information processing apparatus in which input data is divided and processed in parallel, the present invention reduces the size of a storage area for storing divided data to be referenced in processing at a subsequent stage.

According to one aspect of the present invention, there is provided an information processing apparatus comprising: a division unit configured to divide input data into a plurality of pieces of divided data; a processing unit configured to perform predetermined processing for each piece of the divided data to generate processed divided data; and a generation unit configured to generate a plurality of pieces of intermediate data by referencing a plurality of groups of divided data respectively, each group including one or more pieces of the processed divided data, and to combine the plurality of pieces of the intermediate data to generate output data, wherein the information processing apparatus further comprises: a temporary storage unit configured to store the processed divided data; and a detection unit configured to select a group of divided data that includes the processed divided data stored in the temporary storage unit among the plurality of groups of divided data, and to determine whether or not all processed divided data included in the selected group of divided data is stored in the temporary storage unit, wherein as a result of the determination performed by the detection unit, if it is determined that all the processed divided data is stored, the generation unit generates intermediate data by referencing the selected group of divided data and then deletes all the processed divided data included in the selected group of divided data from the temporary storage unit, and if it is determined that a part of the processed divided data is not stored, the processing unit preferentially generates the part of the processed divided data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart illustrating exemplary operations of the information processing apparatus 100 in the embodiment of the present invention;

DESCRIPTION OF THE EMBODIMENTS

Figure 7:
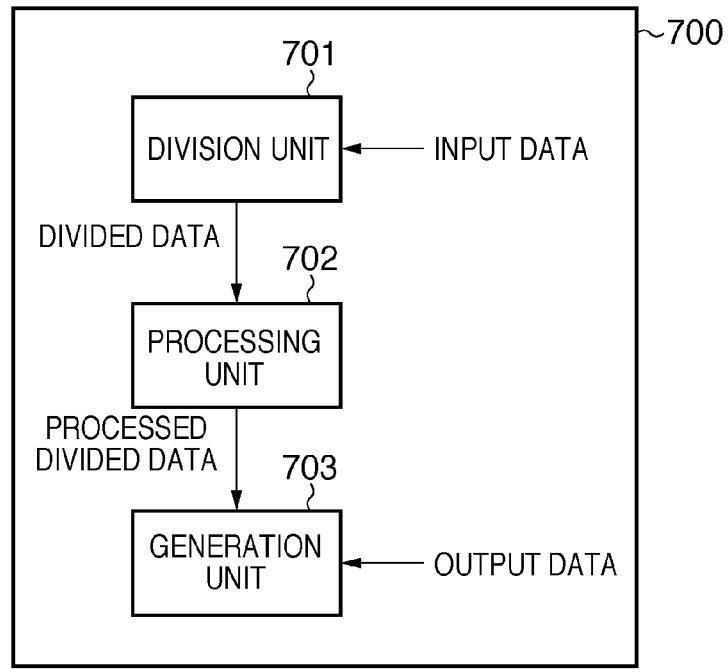
FIG. 7 is a diagram illustrating an exemplary information processing apparatus 700 to which the present invention is applied.

The present invention is applied to an information processing apparatus 700 as shown in FIG. 7 that includes a division unit 701, a processing unit 702, and a generation unit 703. FIG. 7 is a diagram illustrating the exemplary information processing apparatus 700 to which the present invention is applied. The division unit 701 divides input data into a plurality of pieces of divided data. The processing unit 702 performs predetermined processing for each piece of the divided data to generate processed divided data. The information processing apparatus 700 may include more than one processing unit 702. The generation unit 703 generates a plurality of pieces of intermediate data by referencing a plurality of groups of divided data respectively, each group including one or more pieces of the processed divided data. The generation unit 703 further combines the pieces of the intermediate data to generate output data. The present invention is applicable to any information processing apparatus 700 having such a configuration.

Figure 8:
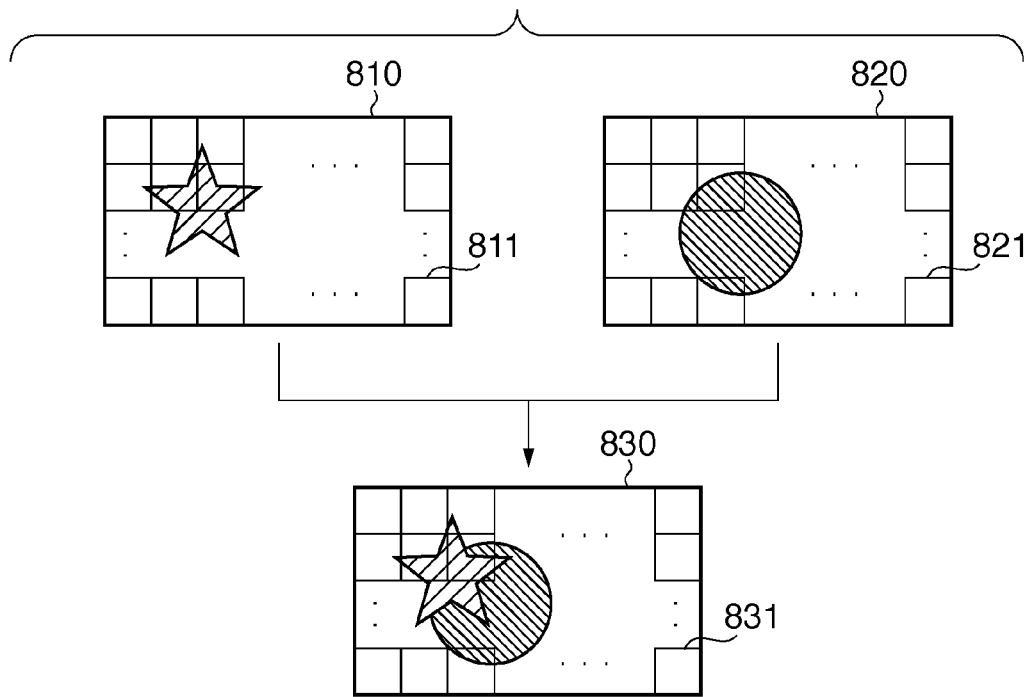
FIG. 8 is a diagram illustrating exemplary processing by the information processing apparatus 700 to which the present invention can be applied.

The information processing apparatus as above performs, for example, composition processing for image data as shown in FIG. 8. FIG. 8 is a diagram illustrating exemplary processing by the information processing apparatus 700 to which the present invention can be applied. The information processing apparatus 700 composes image data C 830 from image data A 810 and image data B 820. In the image composition processing, the image data A 810 and the image data B 820 correspond to the input data, and the image data C 830, which is composite image data, corresponds to the output data.

The division unit 701 divides the image data A 810 and the image data B 820 into tiles to generate packets. Here, a tile is data representing a partial area in the image data, like a tile A 811. A packet is data having a header portion and a data portion, where the data portion includes a tile and the header portion includes a packet ID identifying the packet, route information indicating a processing route for the packet, and processing parameters needed in the processing. In the image composition processing, the tiles correspond to the divided data. Alternatively, the packets may be considered to correspond to the divided data.

The processing unit 702 obtains a packet output from the division unit 701 based on the route information in the header portion and performs processing for the data portion of the packet based on the processing parameters in the header portion. For example, the processing unit 702 corrects a color value, sets the transmittance, etc., for a tile included in the packet. In the image composition processing, such processing corresponds to the predetermined processing, and the processed tiles correspond to the processed divided data.

The generation unit 703 references the processed tiles to generate intermediate tiles. To generate an intermediate tile, a tile in the same position in each piece of the image data, which is the input data, needs to be referenced. For example, to generate a tile C 831, the tile A 811 and a tile B 821 need to be referenced. In the image composition processing, the intermediate tiles correspond to the intermediate data. A group of tiles in the same position, like the tile A 811 and the tile B 821, corresponds to the group of divided data. Finally, the generation unit 703 combines the intermediate tiles to generate the image data C 830.

Although the image composition processing has been described above, processing by the information processing apparatus 700 to which the present invention can be applied is not limited to the image composition processing. For example, the present invention can also be applied to the progressive conversion (IP conversion) of video data. In this case, interlaced video data before the conversion corresponds to the input data, and progressive video data after the conversion corresponds to the output data. Frames of the interlaced video data correspond to the divided data, and error correction and the like correspond to the predetermined processing. Further, a group of frames of the interlaced video data before the conversion at a plurality of times, from which frames of the video data (i.e., the intermediate data) after the progressive conversion are generated, correspond to the group of divided data.

Thus, the present invention can be applied regardless of whether the group of divided data is spatially distributed as in the image composition processing or temporally distributed as in the progressive conversion.

With reference to the accompanying drawings, an embodiment will be described below in which the present invention is applied to the above-described information processing apparatus 700.

First Embodiment

Figure 1:
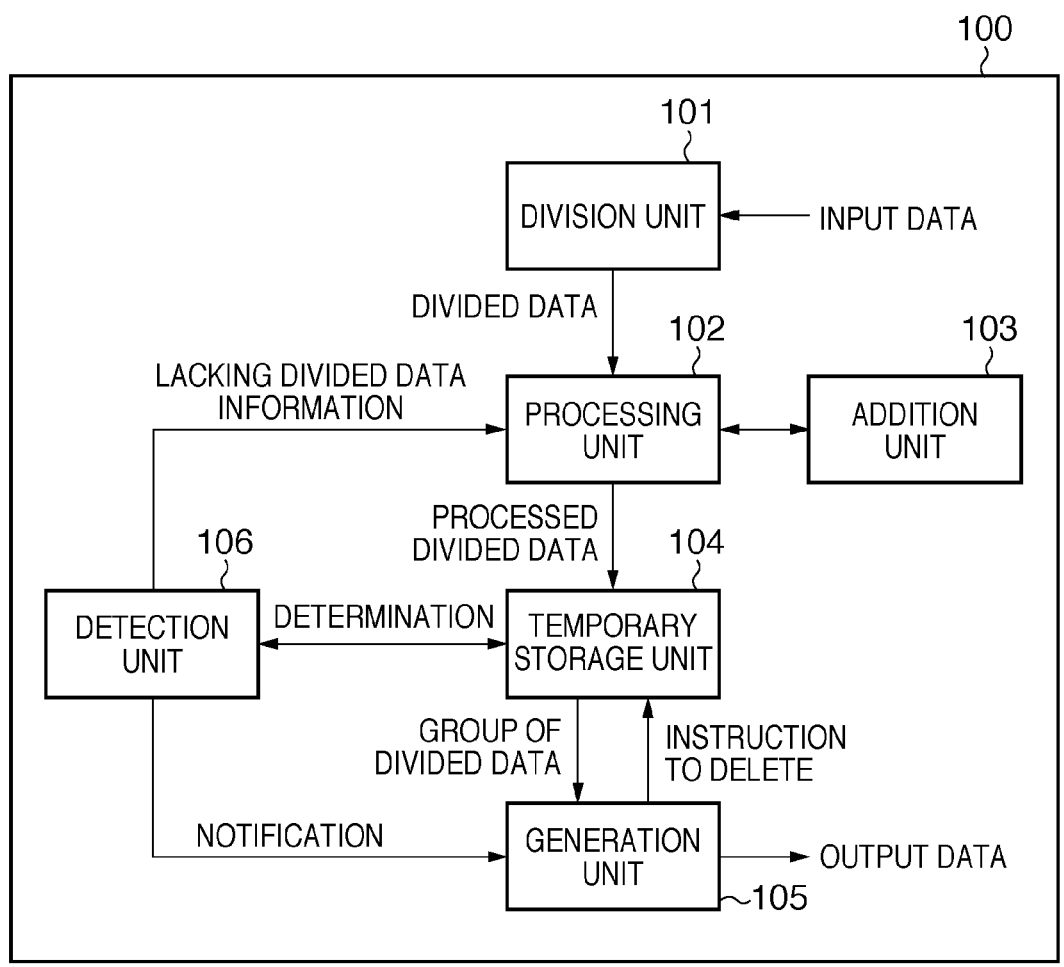
FIG. 1 is an exemplary functional block diagram of an information processing apparatus 100 in an embodiment of the present invention.
Figure 2:
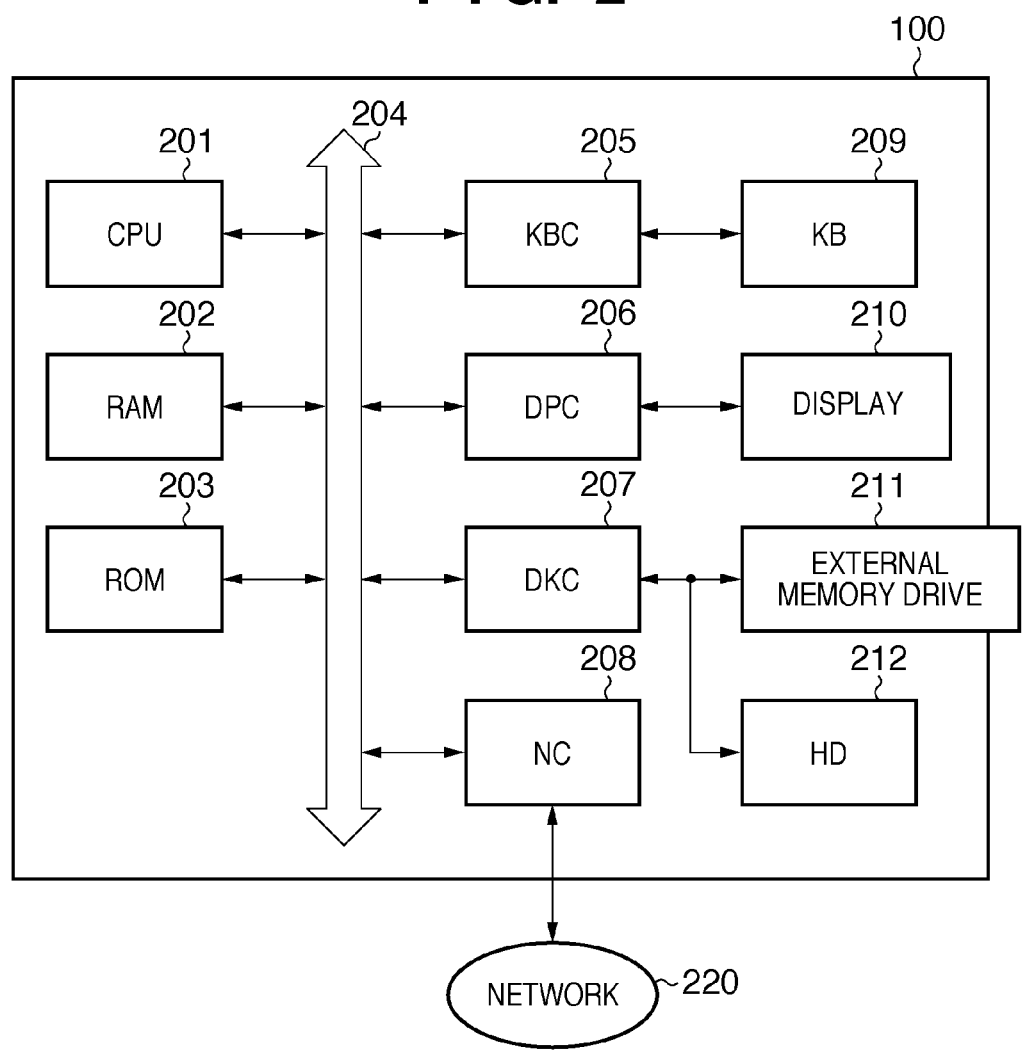
FIG. 2 is an exemplary hardware block diagram of the information processing apparatus 100 in the embodiment of the present invention.

With reference to FIGS. 1 and 2, configurations of an information processing apparatus 100 in this embodiment will be described. FIG. 1 is an exemplary functional block diagram of the information processing apparatus 100 in this embodiment. The information processing apparatus 100 includes a division unit 101, a processing unit 102, an addition unit 103, a temporary storage unit 104, a generation unit 105, and a detection unit 106. As to the division unit 101, the processing unit 102, and the generation unit 105, description will be omitted for the same operations as in the division unit 701, the processing unit 702, and the generation unit 703 respectively as described with reference to FIG. 7, but operations not described above will be described below.

The division unit 101 obtains input data from a storage unit (not shown) or an external device (not shown). The division unit 101 may add a divided data ID to each piece of the divided data for identifying the piece of the divided data. The processing unit 102 stores the processed divided data in the temporary storage unit 104. The addition unit 103 adds, to each piece of the processed divided data, information for specifying other pieces of the processed divided data included in the same group of divided data as that piece of the processed divided data. This information will be called reference data specifying information. For example, if the divided data is the above-described packets, the reference data specifying information may be added to the header portions of the packets. The divided data ID may be used for the reference data specifying information. If the pieces of the divided data and the pieces of the processed divided data are in one-to-one correspondence, the reference data specifying information may be added to the divided data before being processed, rather than to the processed divided data.

The temporary storage unit 104 stores the processed divided data output from the processing unit 102. The temporary storage unit 104 is implemented by, for example, SRAM or the like that allows fast reading and writing. After generating intermediate data, the generation unit 105 deletes all the processed divided data stored in the temporary storage unit 104 and referenced for generating the intermediate divided data. This prevents the available space in the temporary storage unit 104 from being scarce.

The detection unit 106 selects a group of divided data that includes the processed divided data stored in the temporary storage unit 104 and determines whether or not all processed divided data included in the selected group of divided data is stored in the temporary storage unit 104. If it is determined that all the processed divided data included in the selected group of divided data is stored, the detection unit 106 notifies the generation unit 105 that intermediate data can be generated. On the other hand, if it is determined that a part of the processed divided data included in the selected group of divided data is not stored, the detection unit 106 notifies the processing unit 102 of that part of the processed divided data. This part of the processed divided data will be called lacking divided data. Once the lacking divided data is stored in the temporary storage unit 104, the generation unit 105 can generate the intermediate data. The processing unit 102 receives the notification and preferentially generates the lacking divided data, which will be described in detail later.

The reference data specifying information can be used for the above determination. Instead of using the reference data specifying information, a table for managing the groups of divided data may also be used.

FIG. 2 is an exemplary hardware block diagram of the information processing apparatus 100. FIG. 2 shows a minimum configuration for implementing configurations of the information processing apparatus 100 corresponding to embodiments of the present invention, so that other mechanisms are not shown for simplicity of illustration.

A CPU 201, which is a microprocessor, controls the information processing apparatus 100 based on programs, data, and the like stored in ROM 203, a hard disk (HD) 212, and a storage medium that is set in an external memory drive 211.

The RAM 202 functions as a work area for the CPU 201 and holds programs stored in the ROM 203, the HD 212, and the like. The RAM 202 functions as the temporary storage unit 104. The HD 212 may hold the input data and the output data.

The ROM 203, the storage medium that is set in the external memory drive 211, or the HD 212 stores programs and the like executed by the CPU 201 such as one shown in a flowchart to be described later.

Reference numeral 205 denotes a keyboard controller (KBC), which controls input from a keyboard (KB) 209 and from a pointing device such as a mouse (not shown). Reference numeral 206 denotes a display controller (DPC), which controls display on a display 210. Reference numeral 207 denotes a disk controller (DKC), which controls accesses of the HD 212 and the external memory drive 211 to read and write various programs, as well as various kinds of data such as font data, user files, and edit files, from and to their storage media. Reference numeral 208 denotes a network controller (NC), which performs communication with a network 220.

The CPU 201 performs loading (rasterization) processing of outline fonts into a display information area allocated in the RAM 202 or into dedicated video memory (VRAM) for example, to enable display on the display 210. The CPU 201 also opens various registered windows and performs various kinds of data processing based on commands provided by a mouse cursor on the display 210 or the like.

With reference to FIG. 3, operations of the information processing apparatus 100 in this embodiment will be described. Processing in this flowchart is performed by the CPU 201 executing a computer program read into the RAM 202. In step S301, the division unit 101 divides input data to generate divided data. The division unit 101 outputs the generated divided data to the processing unit 102.

In step S302, the processing unit 102 performs predetermined processing for the input divided data. Further, the addition unit 103 adds the reference data specifying information to the processed divided data. The processing unit 102 stores this processed divided data in the temporary storage unit 104. The processing unit 102 may store the processed divided data in the temporary storage unit 104 only if no processed divided data is stored in the temporary storage unit 104 or if processed divided data included in the same group of divided data as the processed divided data currently to be stored is stored in the temporary storage unit 104.

In step S303, the detection unit 106 selects one group of divided data and determines whether or not all processed divided data included in the selected group of divided data is stored in the temporary storage unit 104.

The detection unit 106 may perform the above determination by selecting a group of divided data that includes the processed divided data newly stored in the temporary storage unit 104. The detection unit 106 may also perform the above determination by selecting one group of divided data that includes the processed divided data stored in the temporary storage unit 104, with regular or random time intervals.

If not all the processed divided data included in the group of divided data is present ("NO" in step S303), the process transitions to step S304. In step S304, the detection unit 106 notifies the processing unit 102 of information for specifying lacking divided data (hereinafter called lacking divided data information). Having received the notification, the processing unit 102 changes its operation to preferentially generate the lacking divided data, and returns to step S302.

Figure 4A:
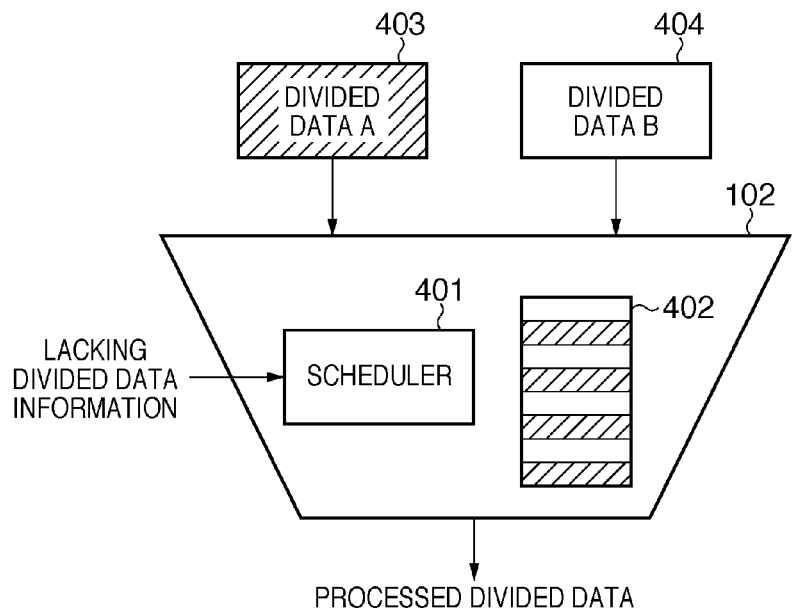
FIG. 4A shows an exemplary configuration in which a scheduler is used for preferential generation in the embodiment of the present invention.
Figure 4B:
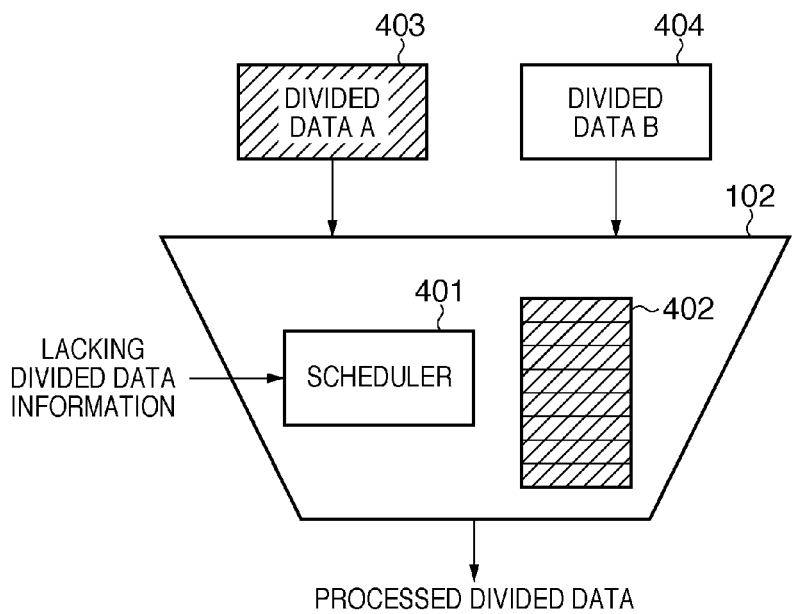
FIG. 4B shows the exemplary configuration in which the scheduler is used for the preferential generation in the embodiment of the present invention.

Methods of preferentially generating the lacking divided data will be described in detail with reference to FIGS. 4A, 4B, and 5. FIGS. 4A and 4B show an exemplary configuration in which a scheduler is used for the preferential generation. The processing unit 102 includes a scheduler 401 and timeslots 402. The processing unit 102 allocates the timeslots 402 to a plurality of pieces of input divided data and performs processing in a time-sharing fashion. The scheduler 401 adjusts the ratio in which the timeslots 402 are allocated to the pieces of the divided data. Before the lacking divided data information is input, the scheduler 401 evenly allocates the timeslots 402 to the pieces of the divided data. Once the lacking divided data information is input, the scheduler 401 allocates more timeslots 402 to a piece of the divided data for generating the lacking divided data. Thus, the lacking divided data is preferentially generated.

For example, as shown in FIG. 4A, before the lacking divided data information is input, the timeslots 402 are evenly allocated to divided data A 403 and divided data B 404. Once the lacking divided data information is input indicating that the lacking divided data is the divided data A 403, the timeslots 402 are preferentially allocated to the divided data A 403, as shown in FIG. 4B. Thus, more processing time is allocated to the divided data A 403.

Figure 5:
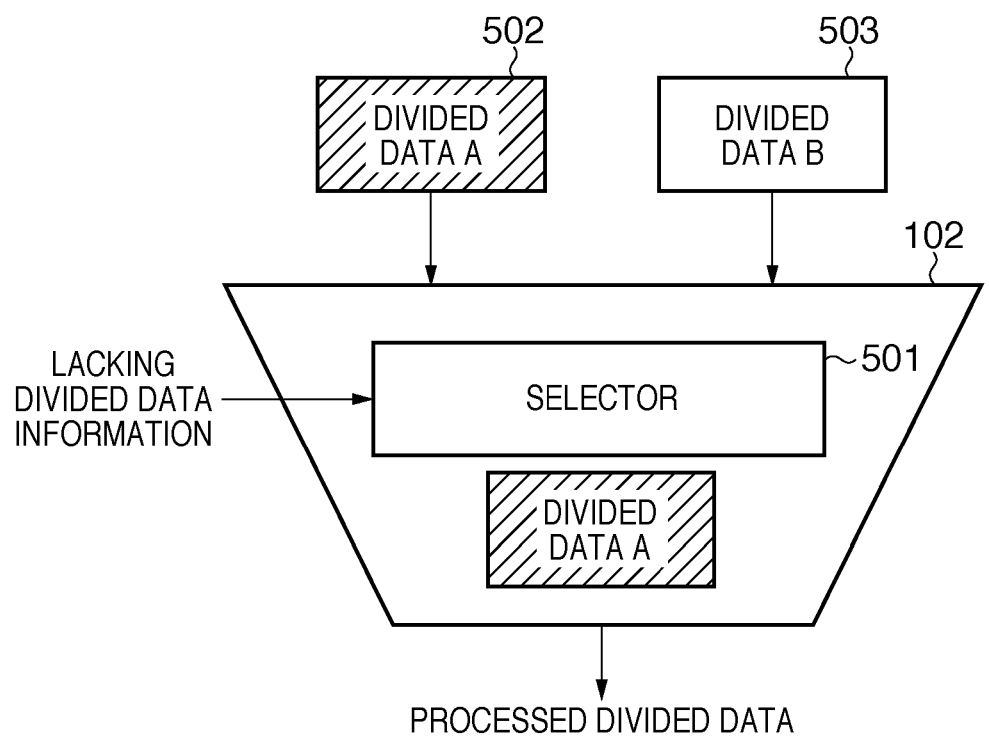
FIG. 5 shows an exemplary configuration in which a selector is used for the preferential generation in the embodiment of the present invention.

FIG. 5 shows an exemplary configuration in which a selector is used for the preferential generation. The processing unit 102 includes a selector 501. The processing unit 102 selects and processes one of a plurality of pieces of input divided data. For example, if divided data A 502 and divided data B 503 are input, either one of them is first processed and the other one is subsequently processed. Before the lacking divided data information is input, the selector 501 selects and processes any of the pieces of the divided data. Once the lacking divided data information is input, the selector 501 selects and processes a piece of divided data for generating the lacking divided data. Thus, the lacking divided data is preferentially generated. For example, if the lacking divided data information is input indicating that the lacking divided data is the divided data A 502, the processing unit 102 selects and processes the divided data A 502, as shown in FIG. 5.

If all the processed divided data included in the group of divided data is present ("YES" in step S303), the process transitions to step S305. In step S305, the detection unit 106 notifies the generation unit 105 that intermediate data can be generated. Having received the notification, the generation unit 105 generates the intermediate data and then deletes the referenced processed divided data from the temporary storage unit 104.

In step S306, the generation unit 105 determines whether or not all intermediate data is present. If not present ("NO" in step S306), the process returns to step S302. If present ("YES" in step S306), the process transitions to step S307, where the generation unit 105 combines the intermediate data to generate output data. The process then terminates. By way of example but not limitation, the output data is stored in a storage unit (not shown).

Thus, if not a complete group of divided data is present in the temporary storage unit 104, lacking divided data is preferentially generated. Therefore, the capacity required for the temporary storage unit 104 can be reduced to around the size of one group of divided data. This allows a significant reduction in the capacity of the temporary storage unit 104 and therefore a reduction in the chip cost. Since the capacity of the temporary storage unit 104 can be reduced, a high-speed storage medium can be adopted as the temporary storage unit 104. This also allows an increase in the overall processing speed.

Figure 6:
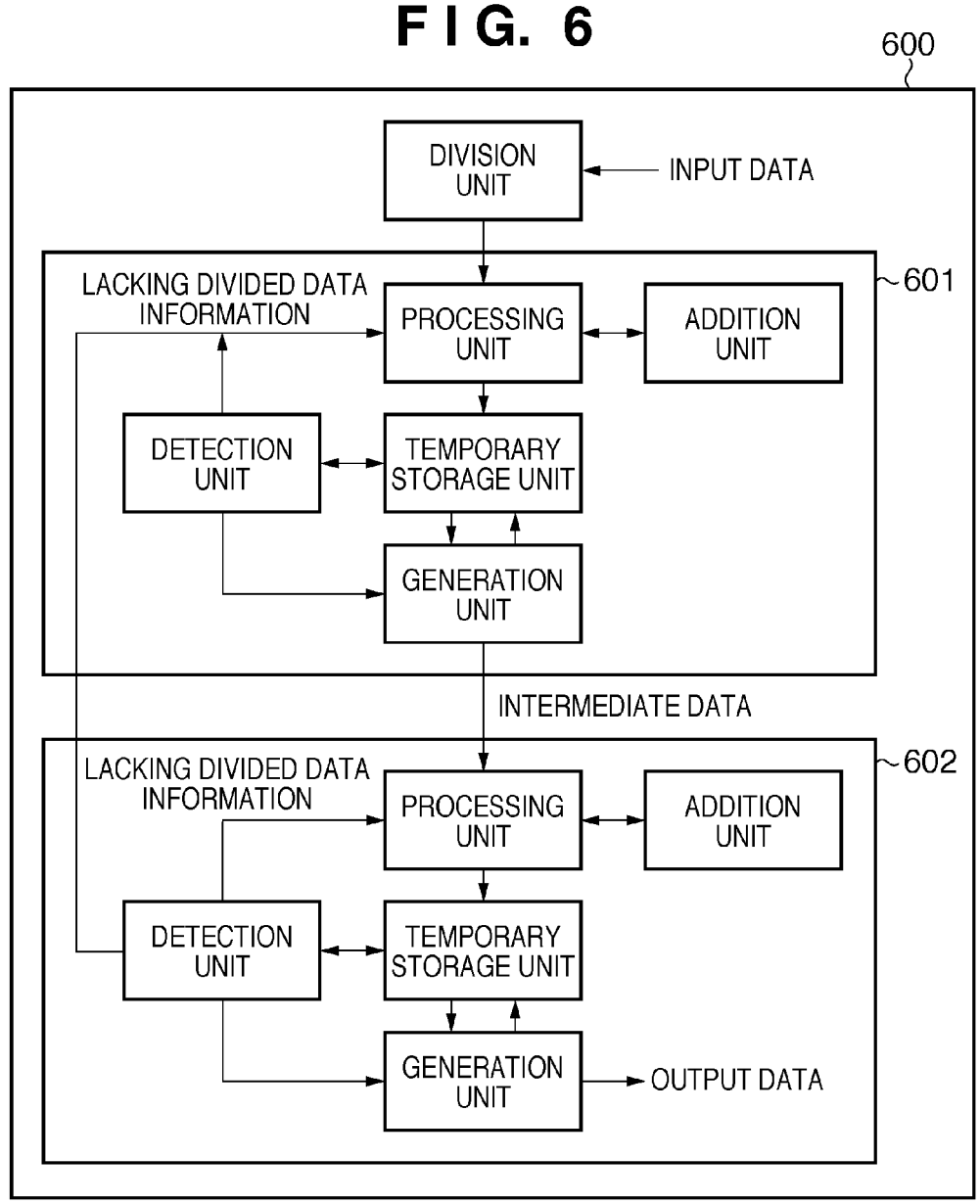
FIG. 6 is a diagram illustrating another exemplary configuration of an information processing apparatus 600 in the embodiment of the present invention.

There may be more than one generation unit 105 and more than one detection unit 106. With reference to FIG. 6, an exemplary configuration different from the information processing apparatus 100 shown in FIG. 1 will be described. As to the components described in FIG. 1, reference numerals are not shown and description will not be given.

An information processing apparatus 600 includes a division unit 101 and two information processing units; an information processing unit A 601 and an information processing unit B 602. The information processing unit A 601 includes a processing unit 102, an addition unit 103, a temporary storage unit 104, a generation unit 105, and a detection unit 106. The information processing unit B 602 also has the same configuration. The generation unit 105 in the information processing unit A 601 outputs intermediate data to the processing unit 102 in the information processing unit B 602. The processing unit 102 in the information processing unit B 602 performs predetermined processing for the intermediate data. The detection unit 106 in the information processing unit B 602 notifies both the processing unit 102 in the information processing unit A 601 and the processing unit 102 in the information processing unit B 602 of the lacking divided data information. Thus, the present invention is applicable to information processing apparatuses having various configurations.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-259996, filed Oct. 6, 2008, which is hereby incorporated by reference herein in its entirety.

What is claimed is:

1. An information processing apparatus comprising:
a division unit configured to divide input data into a plurality of pieces of divided data;
a processing unit configured to perform predetermined processing for each piece of the divided data to generate processed divided data; and
a generation unit configured to generate a plurality of pieces of intermediate data by referencing a plurality of groups of divided data respectively, each group including one or more pieces of the processed divided data, and to combine the plurality of pieces of the intermediate data to generate output data, wherein
the information processing apparatus further comprises:
a temporary storage unit configured to store the processed divided data; and
a detection unit configured to select a group of divided data that includes the processed divided data stored in the temporary storage unit among the plurality of groups of divided data, and to determine whether or not all processed divided data included in the selected group of divided data is stored in the temporary storage unit, wherein as a result of the determination performed by the detection unit, if it is determined that all the processed divided data included in the selected group of divided data is stored, the generation unit generates intermediate data by referencing the selected group of divided data and then deletes all the processed divided data included in the selected group of divided data from the temporary storage unit, and if it is determined that a part of the processed divided data included in the selected group of divided data is not stored, the processing unit generates the part of the processed divided data more preferentially than processed divided data not included in the selected group of divided data.

2. The information processing apparatus according to claim 1, further comprising an addition unit configured to add, to each piece of the processed divided data, reference data specifying information that specifies other pieces of the processed divided data included in the same group of divided data as that piece of the processed divided data, wherein the detection unit performs the determination based on the reference data specifying information.

3. The information processing apparatus according to claim 1, wherein each time new processed divided data is stored in the temporary storage unit, the detection unit selects a group of divided data that includes the new processed divided data and performs the determination.

4. The information processing apparatus according to claim 1, wherein the processing unit performs the predetermined processing for a plurality of pieces of the divided data in a time-sharing fashion, and if the part of the processed divided data is preferentially generated, more time is allocated to the part of the processed divided data.

5. The information processing apparatus according to claim 1, wherein the processing unit performs the predetermined processing by selecting one of a plurality of pieces of the divided data at a time, and if the part of the processed divided data is preferentially generated, divided data for generating the part of the processed divided data is preferentially selected.

6. The information processing apparatus according to claim 1, wherein the input data is interlaced video data, the output data is progressive video data obtained by progressive conversion of the interlaced video data, and the divided data is frames of the video data.

7. The information processing apparatus according to claim 1, wherein the input data is a plurality of pieces of image data, the output data is composite image data composed from the plurality of pieces of the image data, and the divided data is tiles of the image data.

8. A control method for an information processing apparatus comprising:

a division unit configured to divide input data into a plurality of pieces of divided data;

a processing unit configured to perform predetermined processing for each piece of the divided data to generate processed divided data;

a generation unit configured to generate a plurality of pieces of intermediate data by referencing a plurality of groups of divided data respectively, each group including one or more pieces of the processed divided data, and to combine the plurality of pieces of the intermediate data to generate output data; and a temporary storage unit configured to store the processed divided data, wherein the method comprises selecting a group of divided data that includes the processed divided data stored in the temporary storage unit among the plurality of groups of divided data, and determining by a detection unit whether or not all processed divided data included in the selected group of divided data is stored in the temporary storage unit, wherein as a result of the determination, if it is determined that all the processed divided data included in the selected group of divided data is stored, the generation unit generates intermediate data by referencing the selected group of divided data and then deletes all the processed divided data included in the selected group of divided data from the temporary storage unit, and if it is determined that a part of the processed divided data included in the selected group of divided data is not stored, the processing unit generates the part of the processed divided data more preferentially than processed divided data not included in the selected group of divided data.

9. A computer program stored in a non-transitory computer-readable storage medium for causing a computer to function as the information processing apparatus according to claim 1.

* * * * *